Dec. 2, 1958     J. V. THURMOND ET AL     2,862,632
POWER TRANSMITTING ASSEMBLY FOR REFUSE HANDLING VEHICLES
Filed Jan. 12, 1956     6 Sheets-Sheet 1

FIG.1.

INVENTORS
JIMMIE V. THURMOND,
ORIN M. ANDERSON,
WILLIAM A. FERRARI,
FRANCIS H. DEAN
BY
Cushman, Darby & Cushman
ATTORNEYS

FIG. 2.

INVENTORS
JIMMIE V. THURMOND,
ORIN M. ANDERSON,
WILLIAM A. FERRARI,
FRANCIS H. DEAN

Dec. 2, 1958 J. V. THURMOND ET AL 2,862,632
POWER TRANSMITTING ASSEMBLY FOR REFUSE HANDLING VEHICLES
Filed Jan. 12, 1956 6 Sheets-Sheet 3

INVENTORS
JIMMIE V. THURMOND,
ORIN M. ANDERSON,
WILLIAM A. FERRARI,
FRANCIS H. DEAN

BY Cushman, Darby & Cushman
ATTORNEYS

Dec. 2, 1958 J. V. THURMOND ET AL 2,862,632
POWER TRANSMITTING ASSEMBLY FOR REFUSE HANDLING VEHICLES
Filed Jan. 12, 1956 6 Sheets-Sheet 5

INVENTORS
JIMMIE V. THURMOND,
ORIN M. ANDERSON,
WILLIAM A. FERRARI,
FRANCIS H. DEAN
BY
Cushman, Darby & Cushman
ATTORNEYS Dec. 2, 1958   J. V. THURMOND ET AL   2,862,632
POWER TRANSMITTING ASSEMBLY FOR REFUSE HANDLING VEHICLES
Filed Jan. 12, 1956   6 Sheets-Sheet 6

FIG. 8.

INVENTORS
JIMMIE V. THURMOND
ORIN M. ANDERSON
WILLIAM A. FERRARI
FRANCIS H. DEAN
BY
Cushman, Darby & Cushman
ATTORNEYS

United States Patent Office 2,862,632
Patented Dec. 2, 1958

2,862,632

POWER TRANSMITTING ASSEMBLY FOR REFUSE HANDLING VEHICLES

Jimmie V. Thurmond, Orin M. Anderson, and William A. Ferrari, San Antonio, and Francis H. Dean, Houston, Tex., assignors, by mesne assignments, to Pak-Mor Manufacturing Company, San Antonio, Tex., a corporation of Texas Application January 12, 1956, Serial No. 558,673

10 Claims. (Cl. 214—82)

This invention relates to refuse-handling vehicles and, more particularly, to an improved power transmitting assembly for such vehicles.

Refuse-handling vehicles which include a refuse receptacle having a packer plate assembly movably mounted therein for compressing refuse deposited in the receptacle so that the greatest possible load can be transported to the point of discharge are well-known. Heretofore, the power to move the packer plate assembly has been received from a conventional power takeoff mounted at the side of the truck transmission and transmitted to the packer plate assembly through a speed reducing mechanism including a worm gear drive. The utilization of a worm gear drive, while serving to effectively reduce the speed between the power takeoff and packer plate assembly, is highly inefficient and self-locking in nature, and hence in transmitting the power to the packer plate assembly to compress the refuse, the same may become locked in the position moved when the packer is compressed against the refuse so that the same or a greater amount of power is required to return the packer plate assembly to its refuse-receiving position.

Another problem encountered in the vehicles heretofore known resides in the mounting of the power transmitting assembly on the vehicle. Previously, physical requirements dictated that the speed-reducing assembly be mounted between the cab of the truck and the refuse receptacle so that the latter could not be spaced closely adjacent the former. Furthermore, problems of assembly resulted in that it was necessary first to assemble the power transmitting assembly and then subsequently assemble the refuse receptacle thereon. Consequently, the power transmitting assembly was relatively inaccessible for maintenance and repairs.

Accordingly, it is an object of the present invention to provide an improved power transmitting assembly for a refuse-handling vehicle of the type described which substantially overcomes the disadvantages mentioned above.

Another object of the present invention is the provision of a power transmitting assembly for a refuse-handling vehicle of the type described which may be conveniently mounted beneath the vehicle and incorporated therein in lieu of the conventional drive shaft between the vehicle motor and rear wheels.

A further object of the present invention is the provision of an improved power transmitting assembly for a refuse-handling vehicle of the type described which assembly is alternatively connectable with the drive shaft of the vehicle to the rear wheels, which embodies a yieldable torque transmitting device and is non-self-locking so that efficient movement of the packer plate will result.

Still another object of the present invention is the provision of means for disconnecting the power transmitting assembly when the packer plate assembly reaches limiting positions in the forward and rearward ends of the refuse assembly.

Still another object of the invention is the provision of an improved power assembly which includes means for placing the final control of the packer plate assembly movement in the hands of all the operators working the vehicle so as to eliminate any danger of bodily injury due to such movement.

Still another object of the present invention is the provision of an improved power transmitting assembly for a refuse-handling vehicle of the type described which includes means for locking the wheel brakes on the truck after the drive shaft has been disconnected from the power source to thereby render the transmission-locking parking brake inoperable.

These and other objects of the present invention will become more apparent during the course of the following detailed description and appended claims.

The invention may best be understood with reference to the drawings wherein an illustrative embodiment of the invention is shown.

Figure 1:
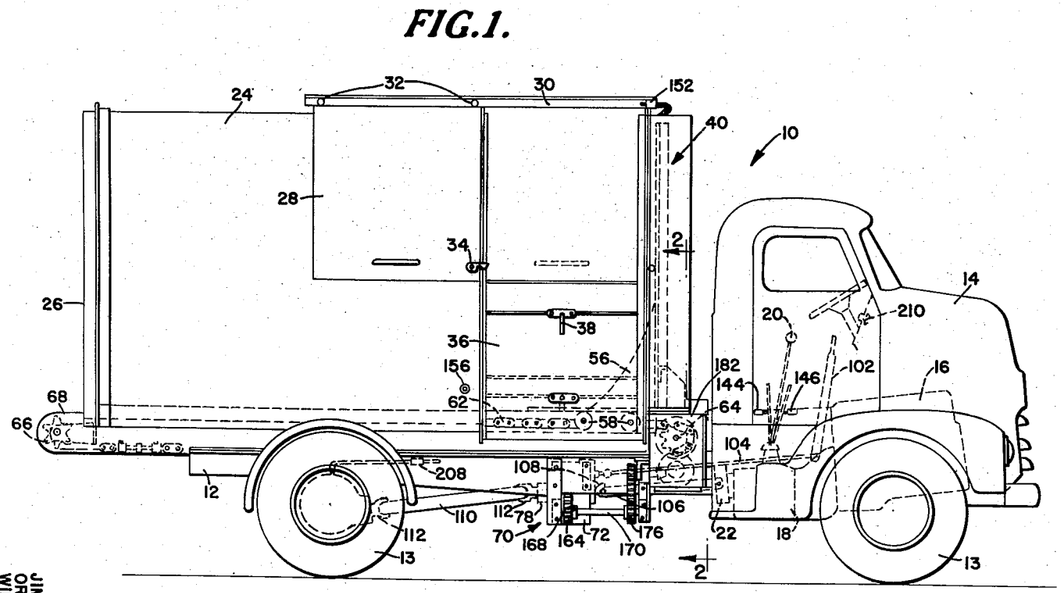
Figure 1 is a side elevational view of a vehicle embodying the principles of the present invention.

Referring now more particularly to the drawings, there is shown in Figure 1 a refuse-handling vehicle which embodies a truck, generally indicated at 10, including the usual frame 12 mounted on wheels 13 and having a cabin 14 mounted at the front end thereof. Mounted within the cabin is the usual motor 16 and a transmission assembly 18 of conventional construction is connected with the motor and has a conventional gear shift lever 20 embodied therein for changing the direction and speed of the drive shaft to the rear wheels of the vehicle. Mounted on the rear of the transmission assembly is a parking brake 22 of conventional construction which is operable to lock the transmission assembly when the motor is not in motion.

The rear portion of the frame 12 has mounted thereon a cylindrical refuse receptable 24 of the type disclosed in Patent No. 2,557,003 issued June 12, 1951, to Louis A. Le Laurin. The receptacle 24 includes a pair of rear discharge doors 26 pivoted about vertical axes on the sides of the receptacle. At the forward end of the receptacle a pair of upper access doors 28 are mounted on each side thereof for longitudinal sliding movement by means of a guide track 30 mounted above the receptacle and guide rollers 32 secured to the doors and riding in the track. A suitable latching device 34 is provided on each door to lock the same in closed position. A pair of lower access doors 36 are hingedly mounted for pivotal movement about longitudinal axes below the doors 28 and include latch devices 38 for locking the same in closed positions.

Figure 2:
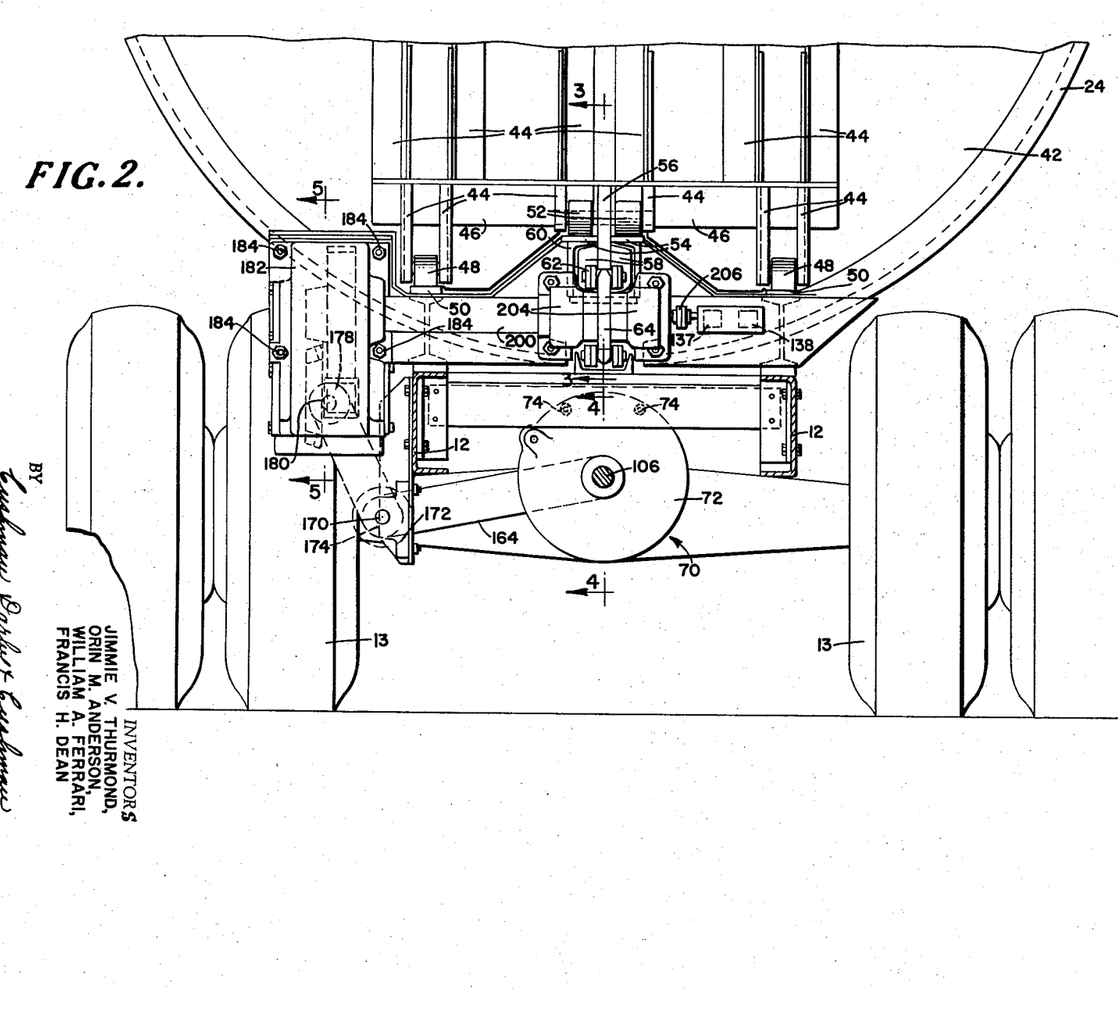
Figure 2 is an enlarged fragmentary sectional view taken along the line 2—2 of Figure 1.
Figure 3:
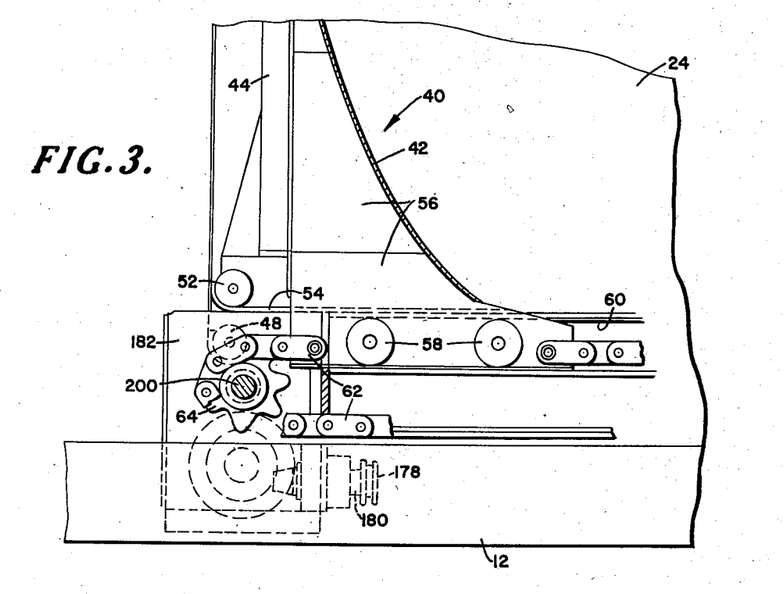
Figure 3 is a sectional view taken along the line 3—3 of Figure 2.

Mounted within the receptacle 24 for longitudinal movement therein is a packer plate assembly, generally indicated at 40, which is operable in a forward limiting position to permit refuse to be deposited into the receptacle through the doors 28 and 36 rearwardly thereof and movable from such position toward a rearward limiting position to compress the refuse against the rear doors 26. This packer plate assembly is constructed generally in the same manner as disclosed in the aforementioned patent. Briefly, the assembly includes a packer plate 42 of circular configuration corresponding with the receptacle and having its lower end curved longitudinally in a rearward direction. Secured to the forward surface of the packer plate 42 so as to add sufficient strength thereto is a plurality of interconnected vertical members 44 and horizontal members 46. As best shown in Figure 2, a pair of lower rollers 48 are suitably journaled to the lower end of the outer vertical members 44 in a position to ride upon horizontal tracks 50 mounted in laterally spaced relation in the bottom of the receptacle. A pair of centrally disposed upper rollers 52 are suitably journaled on the inner vertical members 44 in a position to ride on a pair of closely spaced guide tracks 54 mounted in the central portion of the refuse receptacle. The space between the tracks 54 is open to receive the lower end of a central, triangularly-shaped, vertical plate 56 secured to the forward surface of the packer plate 42 and to the rearward surface of the members 44 and 46. Mounted on the lower end of the plate 56 are longitudinally spaced pairs of rollers 58 which are arranged to ride in cooperating channel members 60 extending longitudinally beneath the tracks 54 and secured to the truck frame 12. Secured to the forward end of the plate 56 is one end of a chain 62 which is trained about a forward sprocket wheel 64 and a rearward sprocket wheel 66, suitably journaled in a housing 68 at the rear of the receptacle, and the opposite end of the chain is secured to the rearward end of the plate 56. It can thus be seen that by driving sprocket wheel 64, packer plate 42 can be longitudinally reciprocated within the receptacle 24.

Figure 4:
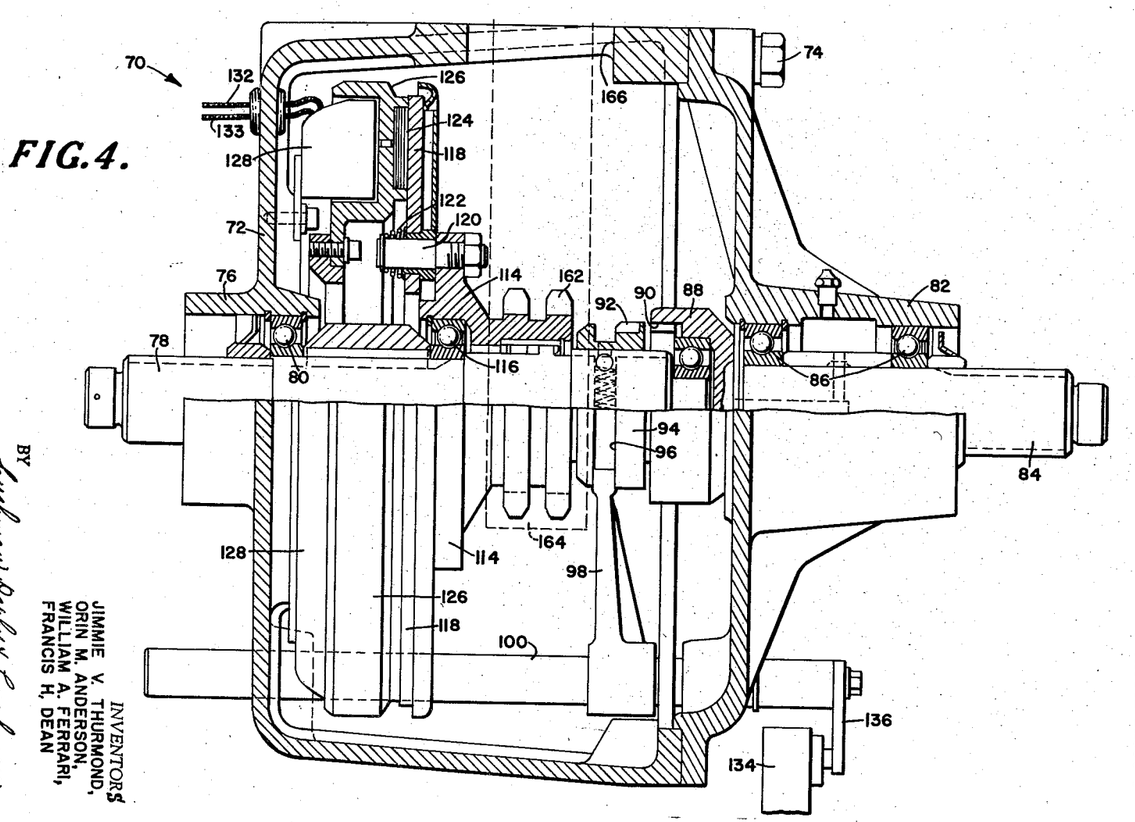
Figure 4 is an enlarged sectional view taken along the line 4—4 of Figure 2.

To effect this movement, a power transmitting assembly, generally indicated at 70, is provided which embodies the principles of the present invention. The assembly 70 includes a casing or housing 72 suitably mounted beneath the truck frame 12, as by bolts 74, in a position rearwardly of the transmission assembly 18 and in alignment therewith. As best shown in Figure 4, the casing 72 includes a forward apertured boss 76 having a power shaft 78 journaled therein, as by ball bearings 80. The rearward end of the casing 72 includes an apertured boss 82 having a drive shaft 84 journaled therein, as by ball bearings 86. Shafts 78 and 84 are axially aligned and the latter is provided with a fixed clutch element 88 having clutch teeth 90 formed thereon which are arranged to be engaged by cooperating clutch teeth 92 formed on a clutch element 94 keyed to the power shaft 78 for axial sliding movement. The clutch element 94 includes a circumferential groove 96 within which one end of a clutch actuating arm 98 is disposed. The opposite end of the arm 98 is rigidly secured to a movable shaft 100 extending through the casing 72 for axial sliding movement. Any suitable means may be connected with the shaft 100 for operating the same from the truck cabin 14 and, as shown, such means may embody a pivoted lever 102 mounted within the cabin and connected with the shaft 100 through a pivotally mounted connecting rod 104. It will be understood that movement of the lever 102 will result in the engagement and disengagement of the teeth 90 and 92 of the clutch elements 88 and 94. The forward end of the power shaft 78 is drivingly connected with the output end of the transmission assembly 18 through a forward shaft 106 having suitable universal joints 108 embodied therein. The rear end of the drive shaft 84 is connected with the rear wheels 13 of the truck by means of a rearward shaft 110 having suitable universal joints 112 embodied therein. It will be understood that the rear wheels are driven from the shaft 110 through a conventional differential gear arrangement, not shown. Thus, when the clutch elements 88 and 94 are in engagement with each other, power from the motor 16 will be transmitted to the rear wheels to drive the truck with the usual control through the gear shift lever 20 being effective.

When the clutch elements 88 and 94 are out of engagement, the assembly 70 provides connection between the power shaft 78 and the packer plate assembly 40 so as to drive the latter. To this end, a driven member 114 is journaled on the rearward end of the power shaft adjacent the clutch element 88, as by ball bearings 116. The driven member includes a circular face plate 118 connected therewith, for relative axial movement with respect thereto, by bolts 120 having springs 122 secured between the ends thereof and the face plate to resiliently urge the latter into engagement with the driven member 114. The face plate 118 is arranged to be moved into frictional engagement with a cooperating surface 124 formed on an annular member 126 rigidly secured to the power shaft. A magnetic coil 128 is fixed within the casing adjacent the member 126 and is operable to be energized to effect the coupling of the member 126 to the face plate 118.

Figure 7:
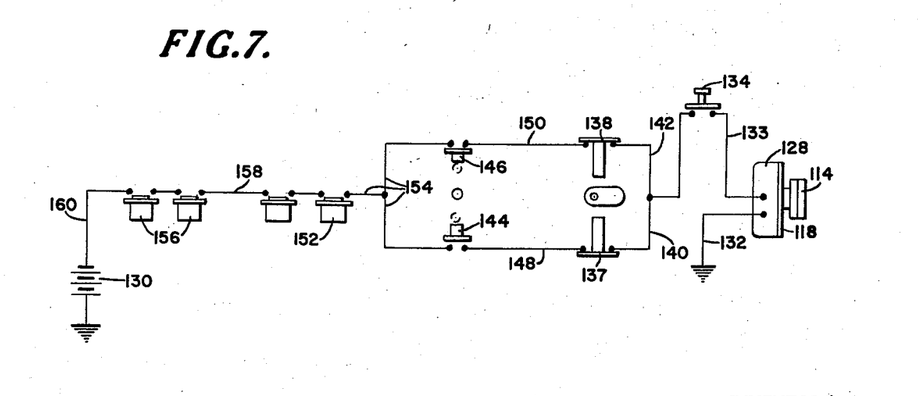
Figure 7 is a wiring diagram of the magnetic coil actuating circuit.
Figure 8:
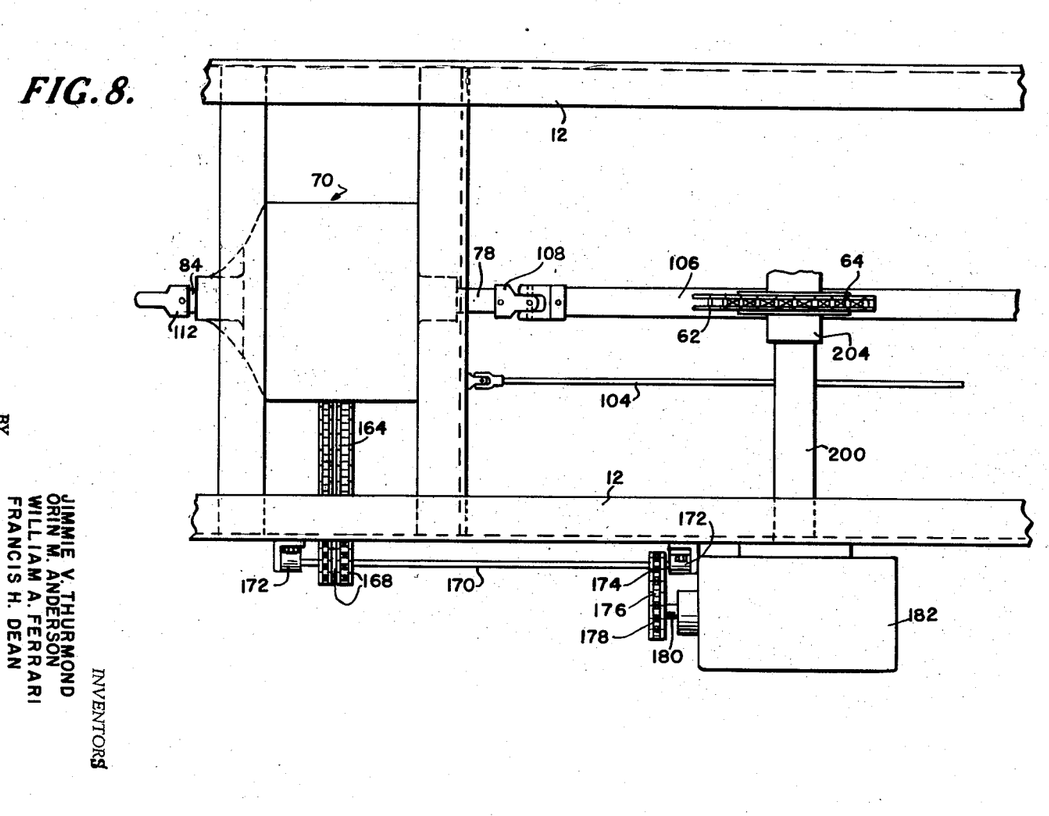
Figure 8 is a fragmentary top plan view of the vehicle with the refuse receptacle removed and the remaining parts shown in elevation.

The coil 128, member 126, and face plate 118 constitute a magnetic coupling for drivingly connecting the driven member 114 to the power shaft and it will be noted that the same is a yieldable torque transmitting coupling which will prevent the transmission of torque to the packer plate assembly which exceeds a predetermined safe upper limit. In order to control the actuation of the magnetic coupling means, there is provided an electrical circuit which may receive its source of power from the battery 130 of the truck, as schematically shown in Figure 7. One lead 132 from the coil 128 is suitably grounded and the other lead 133 thereof is connected with a switch 134 which is mounted adjacent the clutch actuating shaft 100. Switch 134 may be of conventional construction and preferably is of the type which is normally spring pressed to open the circuit and may be moved into a position to close the circuit against such spring action. To effect this latter movement, an actuating bar 136 is mounted on the end of the shaft 100 in a position to engage the switch 134 and move the same into its circuit closing position when the clutch actuating shaft is moved to disengage the clutch elements 88 and 94. It can thus be seen that so long as the power from the motor is transmitted to the rear wheels by virtue of the clutch elements 88 and 94, the magnetic coupling will be inoperable to connect the driven member 114 to the power shaft 78. However, when the clutch elements are disengaged, the magnetic coupling actuating circuit is closed through the switch 134 so that connection of the driven member with the power shaft is possible.

The coil actuating circuit embodies additional safety features which must be actuated before the electrical power from the battery is connected with the coil to energize the same. For example, the circuit includes a pair of switches 137 and 138 which normally complete the circuit, but which are operable to open the circuit when the packer plate assembly has reached a predetermined limiting position either in the forward or rearward end of the receptacle. The switches 137 and 138 may be of any suitable construction and preferably are of the conventional gear type arrangement which may be connected with the forward sprocket wheel 64 to thereby open the circuit after a predetermined number of revolutions thereof. The switches 137 and 138 are connected in parallel with the switch 134 through leads 140 and 142. A pair of switches 144 and 146 are connected in series respectively with the switches 137 and 138 through leads 148 and 150. Switches 144 and 146 are also of conventional construction and preferably are of the type which are spring pressed into a position opening the circuit and movable into a position to close the same. These switches are mounted adjacent the gear shift lever 20 and one is arranged to be actuated to complete the circuit when the lever is moved into a forward driving position while the other is actuated when the lever is moved into a reverse driving position.

In addition to the above, the circuit also includes a pair of switches 152 which are normally spring pressed to open the circuit. These switches are mounted in a position adjacent the doors 28 so as to be actuated to complete the circuit when the doors are closed. The switches 152 are connected in series with switches 144 and 146 through leads 154. Finally, a second pair of switches 156, which are also normally spring pressed to open the circuit, are mounted adjacent the lower doors 36 for manual operation by the attendants. The switches 156 are connected in series with switches 152 through a lead 158 and through a lead 160 to the battery. It can thus be seen that in order for the magnetic coupling to be actuated, not only must the clutch be disposed in its inoperative position, but doors 28 must be closed, switches 156 must be manually operated and the gear shift lever 20 must be in a driving position either forward or reverse.

Figures 5, 6:
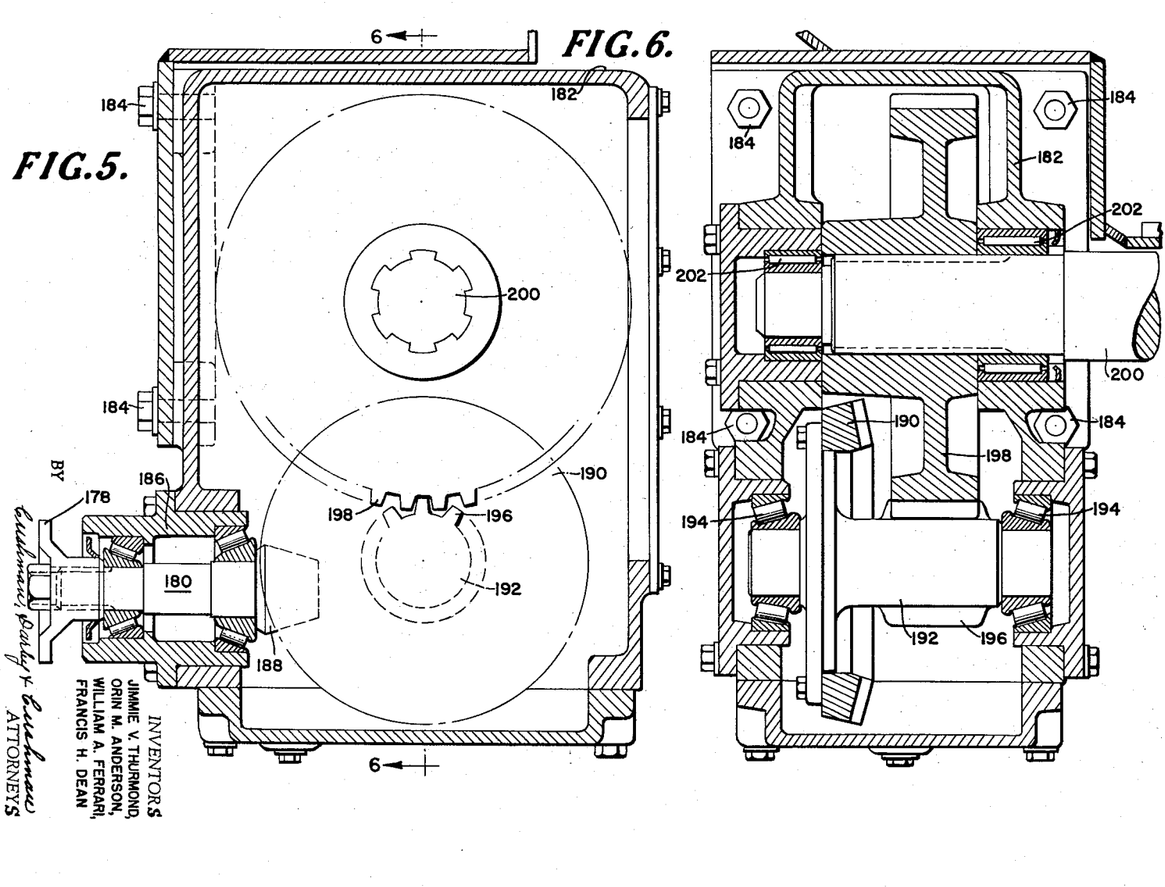
Figure 5 is an enlarged sectional view taken along the line 5—5 of Figure 2.
Figure 6 is a sectional view taken along the line 6—6 of Figure 5.

In order to transmit the motion of the driven member 114 to the packer plate assembly, the former is provided with sprocket teeth 162 around which a chain 164 is trained. The chain extends outwardly of the casing 72 through an aperture 166 and is also trained about a sprocket wheel 168, fixedly mounted on one end of an intermediate shaft 170 journaled on one side of the truck frame 12, as by bearings 172. The opposite forward end of the shaft 170 has a second sprocket wheel 174 fixed thereto and a chain 176 is trained about the sprocket wheel 174 and another sprocket wheel 178 fixed to a stub shaft 180. As best shown in Figures 5 and 6, stub shaft 180 forms a part of a speed-reducing mechanism which is preferably non-self-locking and which serves to transmit the motion from the sprocket wheel 174 to the packer plate assembly and to reduce the speed of the same. The mechanism includes a housing 182 which is secured to the side of the refuse receptacle adjacent its forward end, as by bolts 184. The lower rearward end of the housing is apertured to receive a roller bearing unit 186 within which the stub shaft 180 is journaled. Sprocket wheel 178 is carried on the rearward end of the stub shaft and the forward end thereof is provided with a spiral bevel gear 188 which meshes with a spiral crown gear 190 fixed to a lower shaft 192 suitably journaled within the housing, as by roller bearing units 194. The central portion of the shaft 192 is provided with a small spur gear 196 which meshes with a large spur gear 198 fixed to an upper shaft 200 suitably journaled within the housing, as by roller bearing units 202. The upper shaft 200 extends outwardly of the housing 182 toward the longitudinal center of the vehicle and has the sprocket wheel 64 of the packer plate assembly rigidly secured to the outer end thereof. The outer end of shaft 200 may be anchored to the vehicle frame by means of a pair of journal bearings 204 mounted on each side of the sprocket wheel 64. As shown in Figure 2, the switches 137 and 138 may be connected with the shaft 200 through a flexible coupling 206.

*Operation*

As briefly indicated above, the truck 10 of the present invention may be propelled in the usual manner when the clutch lever 102 is disposed in a position which will engage the clutch elements 88 and 94. In this condition, the drive from the motor 16 is transmitted to the rear wheels 13 of the truck through the transmission assembly 18, forward shaft 106, power shaft 78, drive shaft 84 and rearward shaft 110. Control of the speed and direction of travel of the truck is maintained through the usual instrumentalities including the gear shift lever 20. Thus, with the clutch elements in engagement, the truck acts in the same manner as any conventional automotive vehicle. When it is desired to load refuse into the truck, the motion of the same is stopped and the clutch elements are disengaged by movement of the lever 102. As briefly noted above, this movement of the lever 102 will shift the movable shaft 100 so that bar 136 will engage the switch 134 to complete the coil actuating circuit therethrough. Assuming that the doors 28 are in a closed position and an attendant is on each side of the truck actuating a switch 156, the driver may energize the coil 128 of the magnetic coupling by shifting the gear lever 20 into its rearward drive position thus closing switch 144 and thereby moving the packer plate assembly into its forwardmost limiting position as shown in dotted lines in Figure 1. When the packer plate assembly reaches this position, switch 137 will be operative to open the circuit and, hence, de-energize the magnetic coupling so that power will no longer be transmitted to the packer plate assembly. With the packer plate assembly in this position, the attendants may then deposit refuse within the receptacle 24 rearwardly of the packer plate assembly through the open doors 28 and 36. After a sufficient amount of refuse has been deposited through the doors, the latter are closed so as to complete the coil actuating circuit through switches 152 and the attendants manually press the switches 156 to complete the circuit through the same. The driver then moves the gear shift lever 20 into its forward driving position so as to complete the circuit through switches 138 and 146. This latter movement will cause the transmission assembly to reverse the direction of motion of the truck drive shaft 106 so when the coil 128 is energized, opposite motion will be transmitted through the magnetic coupling to move the packer plate assembly toward the rear of the receptacle. This movement will thus compress the refuse disposed in the receptacle against the rear doors 26 with the magnetic coupling acting to limit the amount of compression which can occur. After the refuse has thus been compressed, the packer plate assembly can be returned to its forwardmost limiting position in the manner previously described to receive the next load. In this manner, the greatest possible amount of refuse can be loaded into the receptacle 24 before it becomes necessary to transport the same to the dumping station. When it is desired to dump the refuse, the rear discharge doors 26 are opened and the packer plate assembly is moved rearwardly, in the manner indicated above, so as to push the compressed refuse out the rear doors. When the packer plate assembly reaches the extreme rearwardmost position switch 138 is operable to open the coil actuating circuit so as to disconnect the driving power from the assembly.

It can thus be seen that there has been provided by the present invention a refuse-handling vehicle which is capable of receiving a maximum load before discharge is necessary, which vehicle includes many safety features which insure that no injury will occur to the attendants. Moreover, by taking the power for the packer plate assembly directly from the rear wheel drive shaft sufficient speed and power is available to perform the refuse compressing function with great efficiency. The power transmitting assembly 70 is relatively compact and can be readily mounted beneath the truck frame in a simple manner. Thus, when maintenance and repair is necessary, the same is conveniently accessible. Furthermore, the position of the assembly does not interfere with the other elements of the vehicle and full receptacle capacity is possible. In addition, the same provides ample ground clearance.

By providing a magnetic coupling, the essential yieldable torque transmitting device is incorporated in the assembly along with the means for engaging and disengaging the same with the power shaft. As briefly noted above, the magnetic coupling is operable to slip when the packer plate assembly, moving into compressing relation to the refuse in the receptacle, reaches an upper predetermined load limit. The utilization of a magnetic coupling means thus performs two essential functions in the assembly. Moreover, since the coupling is electrically actuated, it lends itself to the utilization of many safety control features. First, the coupling cannot be actuated except when the drive between the motor and the rear wheels is disengaged. It has been found that substantially all of the power of the motor may be required to operate the packer plate assembly and consequently the operation of the vehicle therewith is not desirable. In addition, the actuation of the magnetic coupling is also under the control of the two outside attendants who open and close the access doors and load the refuse within the receptacle so that movement of the packer plate assembly cannot occur until they complete their operations. The driver also controls the actuation through the operation of the gear shift lever 20. It can thus be seen that it is impossible to move the packer plate assembly without the active conscious knowledge of all three operators which effectively prevents any accidental injuries which might occur as a result of the movement of the packer plate assembly. Also, in this regard, the provision of limiting switches which automatically release the drive to the packer plate assembly when the latter reaches a limiting position saves wear and tear on the packer plate as well as the magnetic coupling.

Another important feature of the invention is the speed reducing mechanism arrangement which is of the non-self-locking type. As mentioned above, speed reducers, which incorporate worm gear drives, when actuated to compress the refuse become locked under extreme torque conditions and hence to reverse the operation of the packer plate sometimes a greater supply of power is required to unlock the worm gear to effect the return movement of the packer plate assembly. With the present arrangement, the amount of power required to return the packer plate assembly to its forwardmost limiting position is relatively small since none is required to unlock the assembly from an extreme refuse compressing condition. By mounting the speed-reducing mechanism on the refuse receptacle 24, the packing forces are confined to the receptacle and do not act between the truck frame and receptacle. This arrangement also makes possible the assembly of the drive with the receptacle and packer plate for convenient shipment to a final truck installation point, if desired. The position of the speed-reducing mechanism is such that it will clear any part of the truck transmission assembly or other truck equipment that may extend behind the cabin some three or four feet in certain truck models, as, for example, tilt cab trucks and cab forward trucks. Accessibility and convenience of removal for maintenance and repair is provided and only four bolts 184 are required to be removed to withdraw the entire housing 182 without disturbing the chain 62 or sprocket wheel 64 of the packer plate assembly.

Where the truck employed utilizes a transmission locking parking brake, such as the brake 22, the driver of the vehicle may have only foot actuated braking control on the rear wheels since operation of the packer plate assembly necessitates the disengagement of the transmission to the rear wheels. Consequently, the present invention contemplates the utilization in such a truck of a solenoid operated valve 208 in the fluid system of the brakes. The valve 208 may be actuated by a switch 210 mounted within the cabin. Thus, when the packer plate assembly is in operation and it is necessary to lock the rear wheels of the truck, switch 210 may be actuated for this purpose. It will be understood that the above is not required in trucks which employ emergency brakes which are not operative to lock the transmission.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. A refuse handling vehicle comprising a truck having a refuse receptacle, a packer plate assembly movable in said receptacle for compressing refuse deposited therein, ground wheels for propelling the truck, a motor for driving the packer plate assembly and ground wheels, a power shaft connected with said motor, a drive shaft connected with said ground wheels, movable clutch means between said shafts operable in one position to interconnect the same to drive the ground wheels and in a second position to disconnect said shafts, a driven member rotatably mounted with respect to said power shaft about the axis thereof, magnetic coupling means on said power shaft for connecting said driven member therewith, an electric circuit for actuating said magnetic coupling means including means for preventing the actuation of said magnetic coupling when said clutch means is disposed in said one position, and speed reducing means drivingly connected with said driven member and said packer assembly for moving the latter, said speed reducing means including a housing mounted adjacent the front end of said receptacle, and a non-self-locking gear train in said housing.

2. A refuse handling vehicle as defined in claim 1, wherein said gear train includes an input shaft having a bevel gear on the end thereof, a crown gear meshing with said bevel gear, an output shaft having a large spur gear thereon and a small spur gear mounted for rotation with said crown gear and in meshing engagement with said large spur gear.

3. In a refuse handling vehicle having a refuse receptacle, a packer plate assembly movable in said receptacle for compressing refuse deposited therein, access door means for said receptacle movable between opened and closed positions, rear wheels for propelling the vehicle, a motor for driving the packer plate assembly and rear wheels, a power shaft connected with said motor, a drive shaft connected with said rear wheels, clutch means between said shafts operable in one position to interconnect the same to drive said rear wheels and in a second position to disconnect said shafts, a driven member rotatably mounted independent of and adjacent to said power shaft, coupling means for connecting said driven member to said power shaft, control means operable to actuate said coupling means only when said door means is in said closed position and said clutch means is in said second position, and means connected between said driven member and said packer plate assembly for moving the same.

4. In a refuse handling vehicle as defined in claim 3, said control means also including exteriorly disposed means manually operable to actuate said coupling means.

5. In a refuse handling vehicle having a refuse receptacle, a packer plate assembly movable between opposed limiting positions for compressing refuse deposited therein, rear wheels for propelling the vehicle, a motor for driving the packer plate assembly and rear wheels, a transmission assembly including a shiftable lever movable between forward and reverse positions, a power shaft connected with said transmission assembly, a drive shaft connected with said rear wheels, clutch means between said shafts operable in one position to interconnect the same to drive said rear wheels and in a second position to disconnect said shafts, a driven member rotatably mounted independently of and adjacent to said power shaft, coupling means for connecting said driven member to said power shaft, means for connecting said driven member with said packer plate assembly to move the same, and control means operable to actuate said coupling means when said lever is in said forward position to move said packer plate assembly toward one limiting position and when said lever is in said reverse position to move said packer plate assembly toward the other limiting position, said control means being such that movement of said packer plate assembly into said one limiting position when said lever is in said forward position and movement of said packer plate assembly into said other limiting position when said lever is in said reverse position will render the coupling means inoperable, said control means including means preventing actuation of said coupling means when said clutch is in said one position.

6. In a refuse handling vehicle having a refuse receptacle, a packer plate assembly movable between opposed limiting positions for compressing refuse deposited therein, rear wheels for propelling the vehicle, a motor for driving the packer plate assembly and rear wheels, a transmission assembly including a shiftable lever movable between forward and reverse positions, a power shaft connected with said transmission assembly, a drive shaft connected with said rear wheels, clutch means between said shafts operable in one position to interconnect the same to drive said rear wheels and in a second position to disconnect said shafts, a driven member rotatably mounted independently of and adjacent to said power shaft, coupling means for connecting said driven member with said packer plate assembly to move the same, control means operable to actuate said coupling means when said lever is in said forward position to move said packer plate assembly toward one limiting position and when said lever is in said reverse position to move said packer plate assembly toward the other limiting position, said control means being such that movement of said packer plate assembly into said one limiting position when said lever is in said forward position and movement of said packer plate assembly into said other limiting position when said lever is in said reverse position will render the coupling means inoperable, parking brake means connected with said transmission assembly, fluid actuated brakes connected with said rear wheels, valve means for locking said fluid actuated brakes when said clutch means is disposed in said second position, and valve control means for actuating said valve means.

7. In a refuse handling vehicle having a movable packer plate assembly for compressing refuse deposited in the vehicle, ground wheels for propelling the vehicle, and a source of power for driving the packer plate assembly and ground wheels; a power transmitting assembly for installation on the vehicle in lieu of the usual drive shaft between the power source and ground wheels, said power transmitting assembly comprising a casing arranged to be secured beneath the vehicle frame rearwardly of the power source, a pair of aligned shafts journaled in said casing, means for connecting one of said shafts to the power source, means for connecting the other of said shafts to the ground wheels, movable clutch means between said shafts operable in one position to interconnect the same to drive the ground wheels and in a second position to disconnect said shafts, and non-self-locking and yieldable torque transmitting means operatively connected with the power source connected shaft for moving the packer plate assembly, said last mentioned means including a driven member rotatably mounted in said casing independent of said power source connected shaft operable to be driven by the latter when said clutch means is disposed in said second position.

8. A refuse handling vehicle comprising a truck having a refuse receptacle, a packer plate assembly movable in said receptacle for compressing refuse deposited therein, access door means for said receptacle movable between opened and closed positions, rear ground wheels for propelling the truck, a motor for driving the packer plate assembly and ground wheels, a casing secured to the underside of the truck rearwardly of said transmission assembly, a power shaft journaled in said casing and connected with said motor, a drive shaft journaled in casing and connected with said rear wheels, clutch means in said casing between said shafts operable in one position to interconnect the same for driving the rear wheels and in a second position to disconnect said shafts, a driven member journaled in said casing for rotation independent of said power shaft, and drive transmitting means connecting said driven member to said power shaft and to said packer plate assembly when said clutch means is disposed in said second position, said drive transmitting means including a magnetic coupling between said power shaft and said driven member and an electrical circuit for actuating said coupling to connect said driven member to said power shaft when said clutch means is disposed in said second position, said electrical circuit including switch means open when said access door means is in its open position and operable to complete said circuit in response to the movement of said door access means into said closed position.

9. A refuse handling vehicle comprising a truck having a refuse receptacle, a packer plate movable in said receptacle for compressing refuse deposited therein, ground wheels for propelling the truck, a motor for driving said ground wheels and said packer plate assembly, ground wheel power transmission means connected with said ground wheels and engageable with said motor for driving said ground wheels, packer plate power transmission means connected with said packer plate assembly and engageable with said motor for driving said packer plate assembly, clutch means between said motor and said power transmission means operable in one position to engage said ground wheel power transmission means with said motor and to disengage said packer plate power transmission means with said motor and operable in a second position to disengage said ground wheel power transmission means with said motor and to engage said packer plate power transmission means with said motor, said packer plate power transmission means including a magnetic coupling, a non-self-locking speed reducing means, and an electrical circuit for actuating said magnetic coupling, said circuit including means for preventing the actuation of said magnetic coupling when said clutch means is in said one position.

10. A refuse handling vehicle as defined in claim 9 wherein said circuit includes means for deactivating the magnetic coupling in response to the movement of the packer plate assembly into a limiting position within said refuse receptacle.

References Cited in the file of this patent

UNITED STATES PATENTS

| | | |
|---|---|---|
| 1,136,279 | Severy | Apr. 20, 1915 |
| 2,166,846 | McCalley | July 18, 1939 |
| 2,258,988 | Le Laurin | Oct. 14, 1941 |
| 2,379,940 | Van Vleck | July 10, 1945 |
| 2,494,111 | Wagner | Jan. 10, 1950 |
| 2,557,003 | Le Laurin | June 12, 1951 |
| 2,635,771 | Black | Apr. 21, 1953 |
| 2,701,042 | Kurzweil | Feb. 1, 1955 |
| 2,718,292 | Meilander et al. | Sept. 20, 1955 |
| 2,808,158 | Gilleo | Oct. 1, 1957 |